(12) United States Patent
Svensson et al.

(10) Patent No.: US 10,138,101 B2
(45) Date of Patent: Nov. 27, 2018

(54) METHOD IN FORKLIFT TRUCK FOR DETERMINING A LOAD POSITION IN A LOAD RACK

(71) Applicant: BT Products AB, Mjölby (SE)

(72) Inventors: Rune Svensson, Mantorp (SE); Magnus Persson, Sturefors (SE); Håkan Frid, Mjölby (SE)

(73) Assignee: Toyota Material Handling Manufacturing Sweden AB, Mjöbly (SE)

( * ) Notice: Subject to any disclaimer, the term of this patent is extended or adjusted under 35 U.S.C. 154(b) by 479 days.

(21) Appl. No.: 14/861,400

(22) Filed: Sep. 22, 2015

(65) Prior Publication Data

US 2016/0090285 A1    Mar. 31, 2016

(30) Foreign Application Priority Data

Sep. 25, 2014    (EP) .................................... 14186474

(51) Int. Cl.
G06F 7/00        (2006.01)
B66F 9/075       (2006.01)
H04N 13/204      (2018.01)
B66F 9/24        (2006.01)
(Continued)

(52) U.S. Cl.
CPC ............. *B66F 9/0755* (2013.01); *B66F 9/24* (2013.01); *G05D 1/0246* (2013.01); *G06T 7/73* (2017.01); *H04N 13/204* (2018.05); *G05D 2201/0216* (2013.01); *G06T 2200/04* (2013.01); *G06T 2207/10012* (2013.01); *G06T 2207/30252* (2013.01)

(58) Field of Classification Search
CPC ............. B66F 9/0755; B66F 9/24; G06T 7/33
USPC ......... 700/216, 214, 217, 228, 229; 701/201
See application file for complete search history.

(56) References Cited

U.S. PATENT DOCUMENTS 5,738,187 A    4/1998 Dammeyer et al.
8,965,561 B2 *  2/2015 Jacobus ............... G06Q 10/087
                                                   700/214
(Continued)

FOREIGN PATENT DOCUMENTS

DE          10033857 A1    1/2002

OTHER PUBLICATIONS

European Search Report for EP Appl'n No. 14186474.4, dated Mar. 6, 2015.

*Primary Examiner* — Vu Le
(74) *Attorney, Agent, or Firm* — Quarles & Brady LLP

(57) ABSTRACT

The present disclosure relates to a method performed in a forklift truck, for determining a load position in a load rack. The forklift truck includes optical detection means movable with a load carrier. The method includes the steps of determining a reference position related to the optical detection means of a first land mark located on a first height of the load rack based on the position of the first landmark in a first image captured by the optical detection means; determining a second position related to the optical detection means of a second land mark located on a second height of the load rack based on the position of the second landmark in a second image captured by the optical detection means at a predetermined height; and determining a load position on the second height based on a comparison between the reference position and the second position.

20 Claims, 4 Drawing Sheets

(51) Int. Cl.
*G05D 1/02* (2006.01)
*G06T 7/73* (2017.01)

(56) References Cited

U.S. PATENT DOCUMENTS

| 2004/0073359 | A1* | 4/2004 | Ichijo | B66F 9/0755 |
| | | | | 701/50 |
| 2008/0011554 | A1* | 1/2008 | Broesel | B66F 9/0755 |
| | | | | 187/224 |

* cited by examiner

METHOD IN FORKLIFT TRUCK FOR DETERMINING A LOAD POSITION IN A LOAD RACK

CROSS-REFERENCE TO RELATED APPLICATIONS

The present application claims the benefit of European Patent Application No. 14186474.4 filed Sep. 25, 2014, which is fully incorporated herein by reference.

STATEMENT REGARDING FEDERALLY SPONSORED RESEARCH OR DEVELOPMENT

Not applicable.

FIELD OF THE INVENTION

The present disclosure relates to a method performed in forklift truck, for determining a load position in a load rack. The disclosure also relates to a forklift truck for determining a load position in a load rack.

BACKGROUND OF THE INVENTION

From US 2004/0073359 it is known to use a camera for picking up an image of a landmark 17 and acquire an image data of the landmark 17 affixed to the load rack. The described system of this document uses the land marks for position control of the forklift truck. However the prior art does not describe how to avoid bad position control. For example in the prior art systems the camera at the fork lift truck has to have high positioning precision, so that the camera can be used for exact positioning of the cargo using one landmark. The camera has to have high precision since the camera is used for positioning of the load using one landmark when the load e.g. should be lifted or moved. If the camera has low positioning performance there is a risk that the forklift truck is not positioned correctly when e.g. a load should be lifted. This may result in damage of the load or load rack when handling the load.

Yet another problem with prior art systems that uses landmarks is that they require that the camera at the forklift truck is exactly positioned at the forklift truck, so that the camera can be used for exact positioning of the cargo and the forks. If the camera is not positioned correctly on the forklift truck there is a risk that the forklift truck is not positioned correctly when e.g. a load should be deposited or picked-up. This may result in damage of the load or load rack when handling the load. Since the cameras on the prior art systems are sensitive to exact positioning, the prior art systems are also sensitive to shocks, since a shock may cause that the camera moves from its position.

There is therefore a need for an improved solution for determining a load position, which solution solves or at least mitigates at least one of the above mentioned problems, especially at automatic pallet handling.

SUMMARY OF THE INVENTION

It is an object of the present disclosure to provide embodiments solving the problem, in a forklift truck, for determining a load position in a load rack. According to one aspect, the present disclosure is implemented in a ware house with a global positioning system. In the ware house a first reference level of load positions are marked with landmarks. These landmarks are positioned at measured positions in the ware house, and known to the global positioning system.

The forklift truck is manually or automatically positioned in front of the load rack where the forklift truck should leave the load. In case the global positioning system is precise the forklift truck could automatically or manually leave the load on the floor or on the reference level without using the camera and the landmark. To deposit the load at higher levels the forklift truck uses the camera and landmarks placed at higher levels. The landmarks are positioned at predetermined position relative to an element of the load rack. Preferably all landmarks are positioned with a certain distance from a vertical beam of the load rack.

Next, the camera captures an image of the first landmark on the reference level. Processing means in the forklift truck can now determine from the image how the camera on the forklift truck is positioned in relation to the first landmark. Now, since the truck is assumed to be in a correct position relative to the load rack at the reference level, these coordinates is reference coordinates.

Next, the load carrier is raised to a predefined level, a level at which the camera has a free line of sight to a second landmark. A second image is captured of the landmark at this predefined level. The position, i.e. the coordinates, of the second land mark is now compared with the position, i.e. the reference coordinates, of the first landmark. Any differences are used to correct the position of the load carrier. If the camera after the correction would capture an image and compare the position of the second landmark with the first landmark this would result in a perfect match.

Finally the forks are raised to the deposit position and the forks are moved to deposit the load. The errors that might occur during this last maneuver are determined to be relatively small and thus within the tolerances.

Thus an object of the disclosure is to provide embodiments of determining a load position by determining a reference position related to the optical detection means of a first land mark located on a first height of the load rack based on the position of the first landmark in a first image captured by the optical detection means. And further determine a second position of a second land mark located on a second height of the load rack based on the position of the second landmark in a second image captured by the optical detection means at a predetermined height. Further, a load position on the second height is determined based on a comparison between the reference position and the second position.

By determining a reference position of a first landmark and a second landmark related to the optical detection means and compare the positions it is possible to determine mismatches and deviations for the load rack and/or the forklift truck. These mismatches and deviations are then compensated for when determining the load position.

The disclosure presents a method performed in a forklift truck for determining a load position in a load rack, the forklift truck comprising optical detection means movable with a load carrier. The method comprises the steps of determining a reference position related to the optical detection means of a first land mark located on a first height of the load rack based on the position of the first landmark in a first image captured by the optical detection means; determining a second position related to the optical detection means of a second land mark located on a second height of the load rack based on the position of the second landmark in a second image captured by the optical detection means at a predetermined height; and determining a load position on the second height by comparing the reference position and the second position.

The present disclosure also relates to embodiments of a forklift truck for determining a load position in a load rack, comprising an optical detection means movable with a load carrier, a processor and a memory, said memory containing instructions executable by the processor whereby the forklift truck is operative to: determine a reference position related to the optical detection means of a first land mark located on a first height of the load rack based on the position of the first landmark in a first image captured by the optical detection means; determine a second position of a second land mark located on a second height of the load rack based on the position of the second landmark in a second image captured by the optical detection means at a predetermined height; and determine a load position on the second height based on a comparison between the reference position and the second position.

The present disclosure also presents a computer program, comprising computer readable code which, when run in a forklift truck causes the forklift truck to perform the disclosed method.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which.

DETAILED DESCRIPTION OF THE EXAMPLE EMBODIMENTS

The general object or idea of embodiments of the present disclosure is to address at least one or some of the disadvantages with the prior art solutions described above as well as below. The various steps described below in connection with the figures should be primarily understood in a logical sense.

The terminology used herein is for the purpose of describing particular aspects of the disclosure only, and is not intended to limit the disclosure to any particular embodiment. As used herein, the singular forms "a", "an" and "the" are intended to include the plural forms as well, unless the context clearly indicates otherwise.

Figure 1:
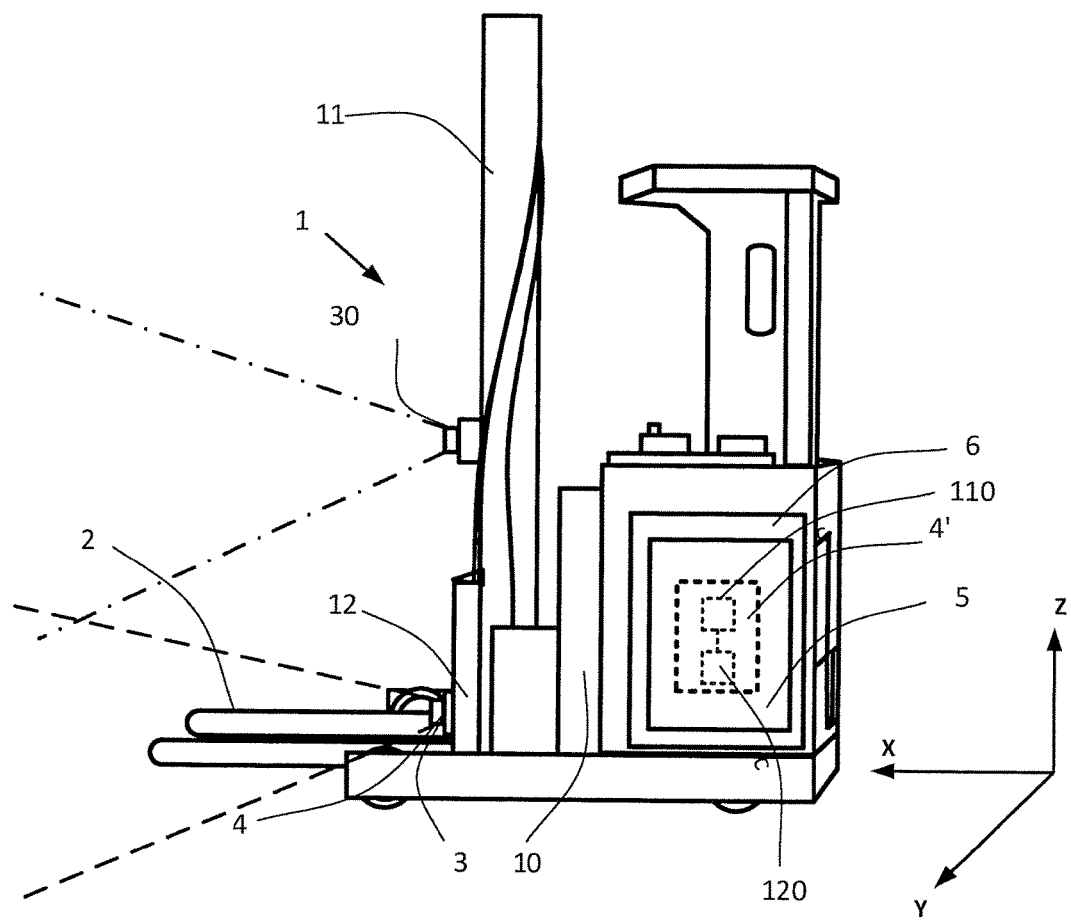
FIG. 1 schematically illustrates a forklift truck according to an embodiment of the present disclosure.

The present disclosure relates to the area of forklift trucks 1, such as disclosed in FIG. 1. In particular it relates to forklift trucks 1 that are electrical and used within a warehouse. Even more particularly, it relates to forklift trucks that are arranged such that they can navigate and move autonomously within a warehouse, for material handling reasons. Still it should be understood that the forklift truck 1 can be both autonomous and be operable by an operator. Also for a manually operated forklift truck 1 the disclosure applies. For an autonomous forklift truck the warehouse is preferably provided with a general guidance system that makes it possible for the autonomous forklift truck to move and navigate for example down to ±10 cm and, depending on the system used, even down to ±10 mm of a predetermined position. The system can for example make use of laser guidance or a combination of laser guidance and wire/rail guidance. There are other techniques of guidance and positioning that can be implemented together with the present disclosure, for example SLAM, simultaneous localization and mapping. Further techniques are for example magnets in the floor, or RFID tag technology etc.

The illustrated forklift truck 1 includes a load carrier 2. The load carrier 2 comprises in one example only one fork (not shown). In the example of FIG. 1, the load carrier 2 comprises two forks. The load carrier 2 is attached to a lifting mechanism such that the forks can move vertically. The load carrier 2 is also provided with hydraulics such that it can move in the lateral direction of the forklift truck 1. The forklift truck 1 is in general provided with a mast 11. However the present disclosure is not limited to forklift trucks having a mast 11. The forklift truck 1 comprises a forklift truck body 10. The forklift truck body 10 is defined as remaining part of the forklift truck 1 when the load carrier 2 and an optional mast 11 are removed. The forklift truck 1 in general also comprises a drive motor that is used for driving a drive wheel and thus moving the forklift truck 1 in a desired direction. The forklift truck 1 further comprises a motor for driving a hydraulic pump; hereinafter we call this motor the pump motor. The hydraulic pump pressurizes a hydraulic system of the forklift truck 1. The hydraulic system of the forklift truck 1 is used for the hydraulic functions of the truck in a manner known to a person skilled in the art. Examples of functions that are handled by the hydraulic system are lifting of the load carrier 2, side shift of the load carrier 2, and longitudinal movement of the mast 11 if the forklift truck 1 is a reach truck, and tilting of the load carrier 2 in the longitudinal direction. In another example side shift of the load carrier 2 and/or tilting of the load carrier 2 are performed by electrical motors. The drive motor and the pump motor are for the discussed type of forklift trucks electrically powered by an energy source. The energy source is in general a suitable rechargeable battery. However, it should be understood that the present disclosure can be used with any type of forklift truck that mostly travels within a warehouse. If the disclosure is to be used on other industrial vehicles comprising load carrier 2 in the form of forks, modifications can be needed as the surroundings alters, and differences in design of their respective lifting mechanisms. However, the use of what is written in this disclosure in other industrial vehicles comprising load carrier 2 is also part of this invention.

A load carrier 2 control unit 5 controls the hydraulics system of the forklift truck 1. The load carrier control unit 5 is also arranged to be able to control a drive motor for a movement of the load carrier 2 in particular in a longitudinal direction of the forklift truck 1. The load carrier control unit 5 also controls other functions for altering position of the load carrier 2, such as controlling a reach function of a forklift truck 1 that comprises such a function, the lift function, the side shift function etc. The load carrier control unit 5 can be fully integrated into a main control unit 6 of the forklift truck 1. This provides for a simple solution and provides for less hardware needed on the forklift truck 1. The load carrier control 5 unit can also be an independent control unit 5. This will make service of the load carrier control unit 5 simpler and will make upgrades of it easier to perform.

According to one aspect of the present disclosure the forklift truck 1 is provided with one optical detection means

3. The optical detection means 3 is preferably a 3D-camera. With the expression 3D-camera is meant a camera that can provide an output that makes it possible to assess the position of coordinates in a volume with x, y, and z coordinates. 3D stands for three-dimensions. The camera is preferably provided with illumination possibilities such that if the surroundings are dark the camera itself can achieve a sufficient lighting for providing a correct output. As an example a 3D-camera can work on the so-called time-of-flight (TOF) principle, which is known in the art. The optical detection means 3 has in one example an angle of view that is in the range of 20° to 180°, preferably 35° to 70°. The 3D-camera should not be confused with a stereo camera having two lenses. The 3D-camera has in general only one lens and uses digital technology to analyse the received optical data and is in general provided with an optical analysing unit 4, 4' to provide said coordinates x, y, z of objects that are detected through the single lens. The optical analysing unit 4, 4' is arranged to be able to receive an output from the optical detection means 3. The optical analysing unit 4, 4' can assess the position of objects in a volume that is covered by the angle of view of the optical detection means 3.

The optical detection means 3 on a forklift truck 1 with a mast 11 is according to one aspect of the present disclosure positioned close to the back of a load carrier sledge 12, see FIG. 1.

According to another aspect of the present disclosure the optical detection means 3 is positioned above the load carrier 2 on a load support (not shown) at the back of the carrier sledge 12. According to one aspect the optical detection means 3 is positioned on the load support at the back of the sledge 12 approximately 1.5 meters above the load carrier 2. An advantage with these aspects is that the optical detection means 3 can have free line of sight to the landmarks 17 without being obscured by the load. The optical detection means 3 will in this position be above the load. In many warehouses where the forklift truck 1 will operate the maximum load height is known. The position of the optical detection means 3 can in these warehouses be adapted so that the load height does not obscure the optical detection means 3. Yet another alternate placement of the optical detection means 3 is at the same height as the load carrier 2, for instance on a side position of the load carrier 2.

The load carrier sledge 12 moves together with the load carrier 2, in the height direction. Thus the optical detection means 3 is movable with the load carrier 2.

Figure 2:
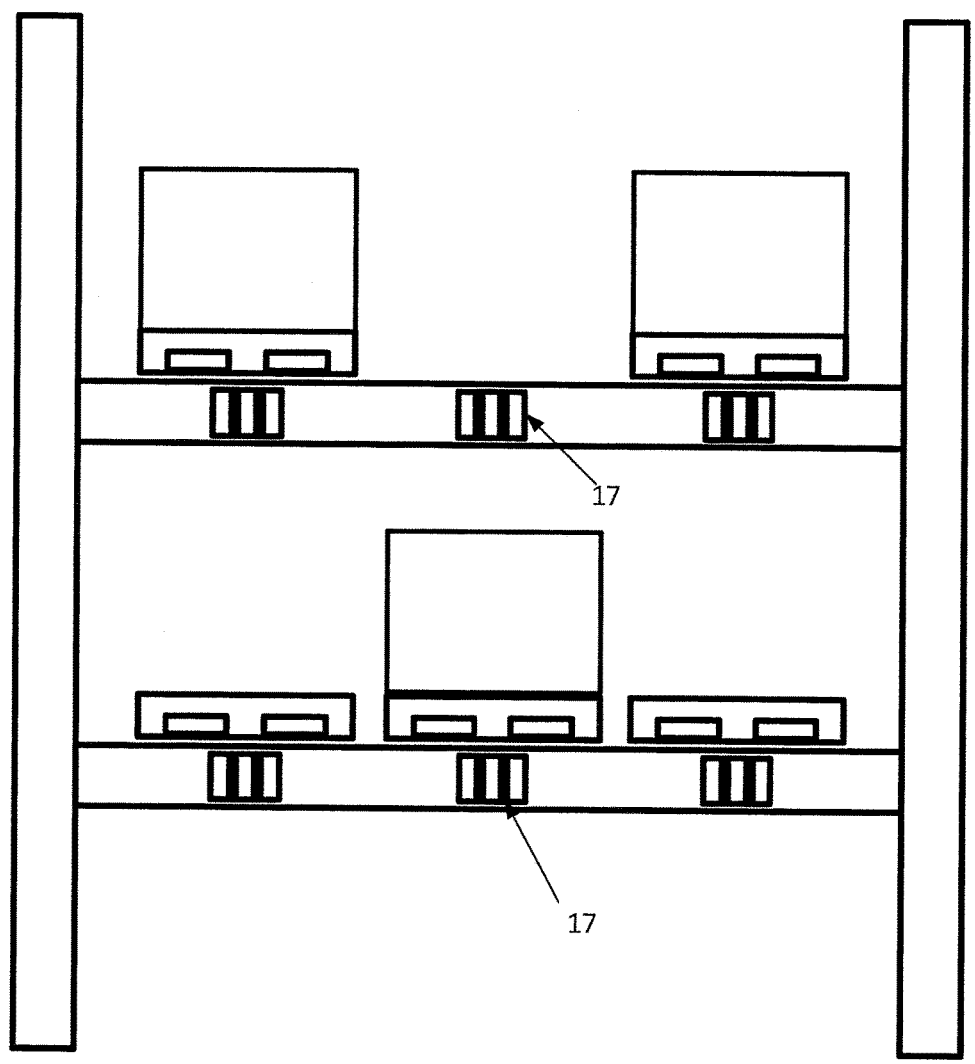
FIG. 2 is a schematic diagram illustrating a load rack with landmarks.

Turning to FIG. 2, which illustrates a load rack where landmarks 17 are used to mark the load positions. A landmark 17 is for example a sign which has a specific predetermined relation to the load position. The landmarks 17 can for instance be positioned at predetermined distances from known elements of the load rack. The landmarks 17 can e.g. be positioned at predetermined distances from a vertical element of the load rack.

Aspects according to exemplary embodiments of the fork lift truck 1 will now be described.

The forklift truck 1 is driven or is automatically positioned close to the load position for the load to be unloaded or picked up in a load rack. Depending on how high the load rack is, there may be e.g. 10 load positions above each other in the load rack. This positioning of the forklift truck is performed at floor level in e.g. a global coordinate system that the forklift truck uses for positioning. The current position of the forklift truck is now within ±10 mm relative to the intended position in the global coordinate system. In case the global positioning system is precise the forklift truck 1 could automatically or manually handle the load on the floor or on the reference level without using the camera and the landmark. To handle the load at higher levels the forklift truck uses the camera and landmarks placed at higher levels.

Figure 3:
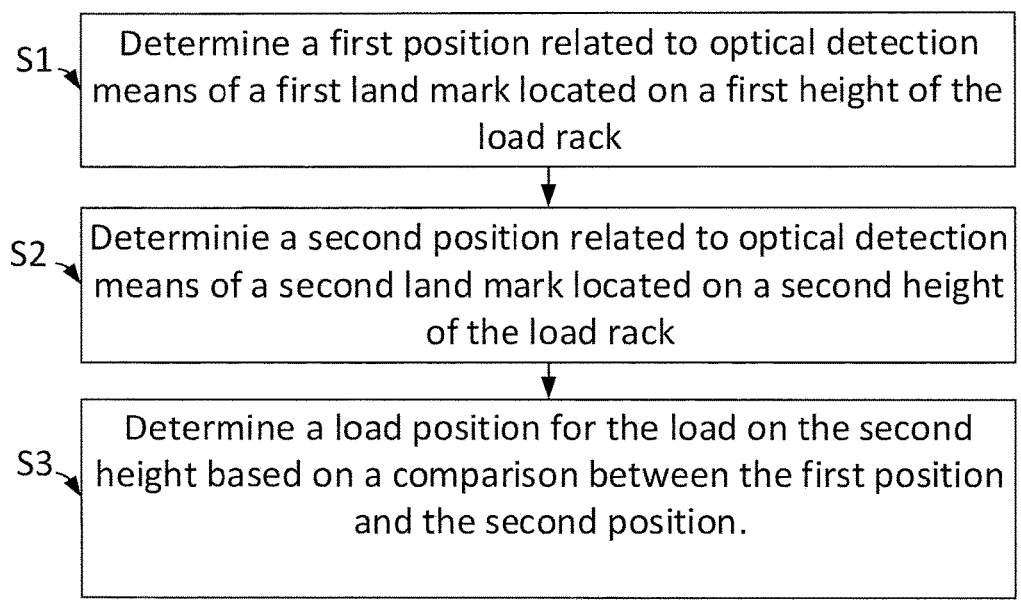
FIG. 3 is a flow chart illustrating the proposed methods performed in a forklift truck.

Now turn to FIG. 3 in which a flowchart schematically illustrates embodiments of method steps performed in the forklift truck 1 for determining the load position in the load rack, the forklift truck comprising optical detection means 3 movable with a load carrier 2. According to one aspect of the present disclosure is a deposit position for a load to be unloaded in the load rack determined. According to another aspect of the present disclosure is a position for a load to be picked up in the load rack determined. The method illustrated in FIG. 3 can be used for both these aspects.

In a first step S1, is a reference position related to the optical detection means 3, 30 of a first landmark 17 located on a first height of the load rack determined. The reference position is determined based on the position of the first landmark in a first image captured by the optical detection means 3, 30. The reference position is considered the reference position since the truck is assumed to be in a correct position relative to the load rack. This since the truck has been positioned by the global positioning system in the ware house and the land marks 17 are positioned at measured positions known to the global positioning system in the ware house. The reference position is determined in a coordinate system of the optical detection means 3, 30. The reference position is thus only known in the coordinate system of the camera.

The landmark 17 can in an exemplary embodiment of the present disclosure be two vertical lines on a horizontal element of the load rack. The landmark 17 can alternatively be of other shapes and/or colors.

In a next step S2, a second position related to the optical detection means 3, 30 of a second landmark 17 located on a second height of the load rack is determined based on the position of the second landmark 17 in a second image captured by the optical detection means at a predetermined height. The position of the second landmark is thus also determined in the coordinate system of the optical detection means 3, 30.

According to one aspect is the predetermined height the second height. In this aspect the optical detection means 3, 30 can capture an image of the second land mark at the second height without being unsighted by the load on the fork lift truck.

According to another aspect is the predetermined height a predetermined height below the second height. In this aspect the optical detection means 3 is positioned on the load support (not shown) at the back of the sledge 12 above the load carrier 2. Since the optical detection means 3 is positioned above the load carrier 2 it is necessary that the load carrier 2 is in this lower position in order for the optical detection means 3 to be able to capture the second image.

According to another aspect is the predetermined height a predetermined height above the second height.

Next in a step S3, is a load position on the second height determined based on a comparison between the reference position and the second position. By comparing the reference position with the second position it is possible to determine the load position. This since the landmarks are positioned at known distances from elements of the load rack and the optical detection means 3, 30 has been moved a predetermined distance after determining the reference position. The land marks 17 can for instance be positioned at a predetermined distance from a vertical beam of the load rack. The theoretical position of the land marks 17 are thus known in a global coordinate system of the ware house in which the load rack is positioned.

However in a real warehouse there are deviations and mismatches which result in that the position between the landmarks 17 are not the same as in the theoretical model of the ware house in which the load rack is positioned. The deviations and mismatches can for instance be a result of that the floor in the ware house is not perfectly even. This results in that the load rack will tilt. If the load rack is high the tilt will be significant at higher levels which means that the forklift truck has to take the tilt into consideration when automatically depositing and/or fetching loads. The load on the forklift truck 1 also makes the mast of the forklift truck 1 to tilt when the load is lifted. This makes the position of the load uncertain even if the forks have been lifted a known distance.

This problem is addressed with the present disclosure since by comparing the reference position with the second position it is possible to determine mismatches and deviations of the load rack, truck and/or other parts of the warehouse.

Since the optical detection means 3, 30 is moved a predetermined distance after capturing the first image the reference position and the second position is known in case where there are no mismatches and deviations in the load rack and/or forklift truck. But since there are misalignments and deviations in the system the reference position and second position will not be the same.

In step S3 the comparison between the reference position and the second position is then used to determine the load position. If e.g. there is a vertical deviation between the reference position and the second position the load carrier needs to be adjusted in a vertical direction in order to compensate for the mismatch and/or deviation in the vertical direction. If e.g. the reference position and the second position differ in a horizontal direction the load carrier needs to be adjusted in the horizontal direction in order to compensate for the mismatch and/or deviation in the horizontal direction.

Thus according to an aspect of the present disclosure, it is not a requirement that the optical detection means 3, 30 is calibrated in position and orientation in relation to the forklift truck 1 or a part of the forklift truck 1, such as the load carrier 2. Should the optical detection means 3, 30 be slightly distorted as can easily happen due to, for example, getting in contact with a load, being shaken by vibrations of the truck, or the like, this will not affect the functioning of the optical detection means 3, 30 as long as it is possible for the optical detection means 3, 30 to view the landmarks 17. It is possible to determine the load position by comparing the reference position and the second position since it is the difference between the reference position and the second position that is used to determine the load position.

Another advantage is that the optical detection means 3, 30 does not have to be able to measure absolute positions with high precision, but have high precision when determining relative positions. This since the optical detection means 3, 30 is not used for exact positioning of the load using only one landmark. The optical detection means is used for determining the position of two landmarks related to the optical detection means, after the optical detection means has been moved a predetermined distance. A comparison between the reference position and the second position is then performed in order to determine the load position. It is thus the difference between the reference position and the second position that is of importance when determining the load position. Not the ability for the optical detection means to determine exact global positions of the landmarks 17.

Turning back to FIG. 1, the forklift truck 1 comprises a processor 110 and a memory 120. The memory 120 contains instructions executable by the processor 110. The processor 110 is a Central Processing Unit, CPU, microcontroller, Digital Signal Processor, DSP, or any other suitable type of processor capable of executing computer program code. The memory 120 is a Random Access Memory, RAM, a Read Only Memory, ROM, or a persistent storage, e.g. a single or combination of magnetic memory, optical memory, or solid state memory or even remotely mounted memory.

According to one aspect, the disclosure further relates to a computer program, comprising computer readable code which, when run on the forklift truck 1 causes the forklift truck 1 to perform any of the aspects of the method described above.

When the above-mentioned computer program code is run in the processor 110 of the forklift truck 1, it causes the forklift truck 1 to determine a reference position related to the optical detection means 3, 30 of a first landmark 17 located on a first height of the load rack based on the position of the first landmark in a first image captured by the optical detection means 3, 30. The computer program codes further causes the fork lift truck 1 to determine a second position related to the optical detection means 3, 30 of a second landmark 17 located on a second height of the load rack based on the position of the second landmark in a second image captured by the optical detection means 3, 30 at a predetermined height and to determine a deposit position for the load on the second height based on the reference position and the second position.

According to one aspect of the present disclosure are the processor 110 and the memory 120 part of the optical analysing unit 4'. The optical analysing unit 4' can be part of a load carrier control unit 5 and/or a master control unit 6 of a forklift truck 1. This provides for a particular simple and cost effective solution. The optical analysing unit 4' can be an individual hardware that is not part of any other control unit of the forklift truck 1. The latter arrangement provides for that maintenance of the optical analysing unit is simplified. In an exemplary embodiment the optical analyzing unit 4 is integrated in the optical detection means 3. This is particularly advantageous as the raw output of the optical detection means 3 does not need to be linked far through the optional mast 11 of the forklift truck 1. Thus this optical analysing unit 4 integrated into the optical detection means 3 means that transfer of the output over a distance is not needed and thus problems with wiring and also problem of transfer of large image files is avoided.

Figure 4:
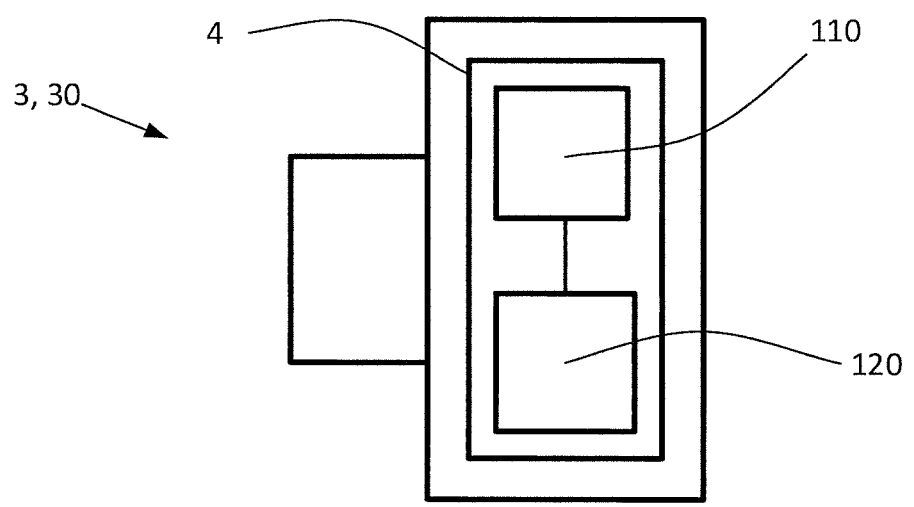
FIG. 4 shows an optical detection unit according to an aspect of the present disclosure.

Turning now to FIG. 4, a schematic diagram is disclosed illustrating an exemplary embodiment of an optical detection means 3. The optical detection means 3 can comprise the processor 110 and the memory 120.

The processor 110 and the memory 120 of the optical analysing unit 4, are here disclosed as being situated in the optical detection means 3, but the optical analysing unit 4 with the processor 110' and the memory 120' can also preferably be located in a body of a forklift truck 1, as described above. In another embodiment of the present disclosure, the processor 110 and the memory 120 are located in an external unit. This means that the forklift truck 1 communicates with the processor 110 and the memory 120 by means of a communication device (not shown). This can preferably be a wire-less link. The communication device comprises in this embodiment an antenna.

According to one aspect, the disclosure further relates to a computer program, comprising computer readable code which, when run on the forklift truck 1 causes the forklift truck 1 to perform any of the aspects of the methods described above.

When the above-mentioned computer program code is run in the processor 110 of the forklift truck 1 it causes the forklift truck 1 to perform the steps of the disclosed methods.

The invention claimed is:

1. A method in a forklift truck, for determining a load position in a load rack, the forklift truck including a camera movable with a load carrier, the method comprising the steps of:
    determining a reference position related to the camera of a first land mark located on a first height of the load rack based on the position of the first landmark in a first image captured by the camera;
    altering a height of the load carrier to alter a position of the camera;
    determining a second position related to the camera of a second land mark located on a second height of the load rack based on the position of the second landmark in a second image captured by the camera at a predetermined height;
    determining the load position on the second height based on a comparison between the reference position and the second position; and
    adjusting a position of the load carrier based upon the determined load position.

2. The method according to claim 1, wherein the reference position and second position are calculated in a coordinate system of the camera.

3. The method according to claim 1, wherein the step of determining the load position further comprising calculating misalignments and deflections in the load rack and forklift truck by determining a distance between the reference position and the second position.

4. The method according to claim 1, wherein the predetermined height is the second height, or at a predetermined height below the second height.

5. The method according to claim 1, wherein said camera is a 3D camera arranged to output three-dimensional data, preferably a 3D-camera working on the time-of-flight principle.

6. The method according to claim 1, wherein said load carrier includes at least one fork.

7. The method according to claim 1, wherein the first land mark and the second land mark are positioned at a predetermined distance from an element of the load rack.

8. A forklift truck for determining a load position in a load rack, comprising:
    a load carrier;
    a camera movable with the load carrier;
    a processor; and
    a memory containing instructions executable by said processor whereby said processor executes said instructions to perform the steps of:
    determining a reference position related to the camera of a first land mark located on a first height of a load rack based on the position of the first landmark in a first image captured by the camera;
    altering a height of the load carrier to alter a position of the camera;
    determining a second position related to the camera of a second land mark located on a second height of the load rack based on the position of the second landmark in a second image captured by camera at a predetermined height; and
    determining the load position on the second height based on a comparison between the reference position and the second position.

9. The forklift truck according to claim 8, wherein the reference position and second position are calculated in a coordinate system of the camera.

10. The forklift truck according to claim 8, wherein the forklift truck is further operative to determining a load position by calculating misalignments and deflections in the load rack and the forklift truck by determining a distance between the reference position and the second position.

11. The method according to claim 8, wherein the predetermined height is the second height, or at a predetermined height below the second height.

12. The forklift truck according to claim 8, wherein said the camera is a 3D camera arranged to output three-dimensional data.

13. The forklift truck according to claim 8, wherein the processor is integrated into the camera.

14. The forklift truck according to claim 8, wherein said load carrier includes at least one fork.

15. The forklift truck according to claim 8, wherein the first land mark and the second land mark are positioned at a predetermined distance from an element of the load rack.

16. A computer-readable storage medium, having stored there on a computer program which, when run in a forklift truck, causes the forklift truck to perform the method as claimed in claim 1.

17. A method of controlling a forklift, the method comprising the steps of:
    positioning the forklift in front of a load rack;
    capturing a first image of a first landmark on the load rack using a camera movable with a load carrier of the forklift;
    altering a position of the load carrier to alter a position of the camera relative to the load rack;
    capturing a second image of a second landmark on the load rack using the camera, the second landmark being offset from the first landmark;
    comparing the first image and the second image using an optical analyzing unit; and
    adjusting the position of the load carrier based upon differences between the first image and the second image determined by the optical analyzing unit.

18. The method of claim 17, further comprising the step of raising the load carrier to deposit a load onto the load rack.

19. The method of claim 17, wherein the second landmark is vertically offset from the first landmark.

20. The method of claim 17, wherein the step of altering a position of the load carrier to alter a position of the camera relative to the load rack is performed by raising the load carrier.

* * * * *